A. H. LYMN.
GENERATION AND UTILIZATION OF PRODUCER GAS.
APPLICATION FILED AUG. 18, 1920.

1,388,052.

Patented Aug. 16, 1921.

INVENTOR:
ARTHUR H. LYMN,
by Spear, Middleton, Donaldson & Hall
Attys.

UNITED STATES PATENT OFFICE.

ARTHUR HENRY LYMN, OF WESTMINSTER, LONDON, ENGLAND.

GENERATION AND UTILIZATION OF PRODUCER-GAS.

1,388,052.

Specification of Letters Patent.     Patented Aug. 16, 1921.

Application filed August 18, 1920.   Serial No. 404,417.

*To all whom it may concern:*

Be it known that I, ARTHUR HENRY LYMN, a subject of the King of Great Britain and Ireland, residing at 40 Westminster Palace Gardens, Victoria street, Westminster, London, England, have invented certain new and useful Improvements in the Generation and Utilization of Producer-Gas, (for which I have filed an application in England, June 4, 1919, No. 14,121/1919), of which the following is a specification.

The present invention relates to improvements in the generation of producer gas and its utilization for the firing of furnace plants such as fuel carbonization plants (coke oven gas retort, and the like plants), boiler installations, metallurgical furnaces and the like.

In all methods for manufacturing producer gas it is necessary to mix a certain amount of steam with the air blast in order to insure proper operation and economical working. Generally, the said steam is raised in an ordinary fuel fired boiler installation. However, the great disadvantage of this arrangement is the consumption of additional fuel, the extra cost of which is especially serious in the case of manufacturing producer gas simultaneously with by-product recovery. In this case, in order to form and afterward prevent the destruction of ammonia, it is necessary to use a very large amount of steam, the cost of which largely counterbalances the value of the by-products obtained.

In connection with the working of gas producers with ammonia recovery, the late Dr. Ludwig Mond, F. R. S., proposed a system of utilizing the heat of waste gases, at a distance, for loading air with moisture, which consisted in transferring the heat of the hot gases, for instance, the exhaust gases from gas engines, or the waste gases from boilers or any other furnaces, to water, by passing the waste gases through a chamber into which water is simultaneously admitted, in such a way that the heater is kept full of water under considerable pressure, so that said water becomes heated to above 100° C.; in then transferring the heat stored in said water to air and bringing this heated air into contact with hot or cold water from a separate source, with the object of transforming a large quantity of this water into steam; and finally in conveying the steam thus produced to the gas producer.

In this system of utilizing the heat of waste gases, the heat stored in said heated water is either transmitted to other water which is brought into direct contact with the air to be heated, or to air which is brought into intimate contact with water from a separate source which may be previously heated.

For transferring the heat of said hot water to other water which is in direct contact with the air to be heated, or to air brought into intimate contact with preferably preheated water, the temperature of the water to which the heat from the hot gases is transferred is kept at above 100° in order to make the operation efficient; and for this reason a constant and considerable pressure must be maintained in the chamber into which the hot waste gases are passed. This necessitates a very substantial construction of said chambers.

According to the present invention, the transference of the heat from the waste gases is effected in an apparatus under substantially atmospheric pressure, and the heated water itself is brought into intimate direct contact with the air to be heated.

The invention comprises a method of generating and utilizing producer gas which consists in passing the hot products of combustion obtained from furnace plants fired with producer-gas, such as fuel carbonization plants (coke-oven, gas-retort and the like plants), boiler installations, metallurgical furnaces and the like, into direct intimate contact with a liquid so as to heat said liquid at substantially atmospheric pressure; circulating said heated liquid in contact with air so as to heat said air and saturate it with steam or vapor; passing said heated and saturated air into the producer; utilizing the gases generated in said producer for heating said furnace plant, and again passing the liquid used for preheating and saturating the air into contact with the said hot products of combustion of said furnace fired with producer-gas, in a continuous cycle.

The steam or vapor may be raised either by indirectly heating water or other liquid in suitably designed boilers by means of the hot combustion gases leaving the furnace, or directly by bringing the said hot combustion gases into direct contact with water or other liquid. In either case, a large amount of the sensible heat of the combustion gases is transferred to the water and in turn to the steam or vapor, the latter in its turn being utilized to saturate the air blast up to a suitable temperature on its way to the gas producer. If desired both the direct and indirect methods may be used conjointly. The steam or vapor is partially decomposed in the producer and the products of decomposition leave the producer as producer gas together with all excess of steam or vapor remaining undecomposed, which may be largely eliminated from the gas by condensation, the producer gas being used for firing the furnace plants such as fuel carbonization plants (coke oven, gas retort and the like plants) boiler installations, metallurgical furnaces and the like. The hot combustion gases issuing from said plant are continuously used for thus raising steam or vapor, the series of operations being more or less a repeating cycle.

As the quantity of steam required to be added to the air varies with the fuels in use, means may be provided for regulating the volume of air intended to be saturated with moisture; for example, by arranging a by-pass pipe to enable a part of the air to pass around the air saturating vessel, and introducing this by-passed air into the mixture of air and steam leaving the said vessel so that the whole of the air and steam mixture will be a suitably saturated air blast for use in the producers.

The plant for carrying out this process consists of:—

A furnace plant such as a fuel carbonization plant (coke-oven, gas-retort and the like plant), boiler installation metallurgical furnace plant or any other plant fired by producer gas generated in a producer gas plant, the air blast for which is saturated, up to a suitable predetermined temperature, with steam or vapor obtained through the heat of the combustion gases issuing from the firing chambers of the furnace plant.

As previously stated, the steam or vapor may either be raised in suitably designed boilers or water heaters which are indirectly heated by the products of combustion of the producer gas coming from a gas-fired furnace plant, or the said products of combustion may (after passing through said boilers or without passing through said boilers) be brought into intimate contact with water or other liquid and heat the same, the heated liquid being delivered to another vessel, where it is brought into intimate contact with a current of air passing on its way to the producer. The air thus becomes saturated with the vapor of the liquid at or near the temperature of the liquid with which it is brought into contact.

The water or liquid heater and air heater and saturator need not be separate apparatus. The two apparatuses may be placed on top of one another and separated by a suitable seal formed by the circulating water or liquid.

Means may also be provided for overcoming the disadvantages arising from the corrosive action of the hot combustion gases on the metal of the apparatus with which they come in contact.

To this end the water or liquid which is being circulated through the apparatus may be maintained at as high a temperature as possible, in order to prevent the water or other liquid from absorbing the sulfur or other corrosive compounds contained in the products of combustion of the producer gas.

Or the acidity of the circulating water or liquid may be directly neutralized by any suitable alkali (salt, or solution or solid including washer liquor from the by-product producer plant itself as it always contains ammonia). Or again, the producer gas itself may be utilized indirectly.

With this latter object in view, another vessel may be interposed between the water or liquid heating means and the air blast saturating means, for example, the hot combustion gases coming from the producer gas-fired plant are caused to ascend a vessel such as a gas washer, preferably of the kind described in the specification of U. S. A. Patent No. 1,081,241, where they meet a descending current of liquid. The sulfur compounds contained in the combustion gases are, to some extent, absorbed by the liquid and the resulting liquor is then brought into direct contact with a current of hot producer gas in the intermediate apparatus aforesaid. Inasmuch as producer gas generated in a by-product plant always contains ammonia (indeed, in an ordinary producer plant also), this will tend to neutralize the sulfur or other acid compounds absorbed by the liquid and thus reduce any tendency to corrosive action.

The liquor thus having been further heated by the hot producer gas is now brought into contact with the air intended for the producer blast, the heat of said liquor being given up and communicated to said air, which is thus both heated and saturated with vapor. The liquor which now contains some ammonia or ammonia salt in solution is returned to the first vessel where it meets the products of combustion issuing from the producer gas-fired furnace plant, and neutralizes the sulfur compounds absorbed from said combustion gases.

The liquor is continuously circulated through this series of apparatuses and any ammonium salt that may have been formed is recovered by any of the well-known systems.

The ammonium salt, e. g., ammonium sulfate, above mentioned may be formed as follows:—

In the first vessel sulfurous acid is more or less absorbed by the water coming into contact with the hot combustion gases. The liquor containing now sulfurous acid in solution is brought into contact with hot producer gas and the ammonia of said producer gas combines with the sulfurous acid to form ammonium sulfite in the second tower. The liquor containing ammonium sulfite is brought into contact with the air on its way to the producer and part of the ammonium sulfite contained in said liquor may become oxidized to ammonium sulfate in the third vessel.

In order to clearly understand the invention, reference is made in the accompanying drawings, which show by way of example one way of carrying out the invention in connection with a gas-fired furnace.

In said drawings, Figure 1 shows a general arrangement of a gas producer and gas-fired furnace plant in accordance with the invention.

Figure 1:
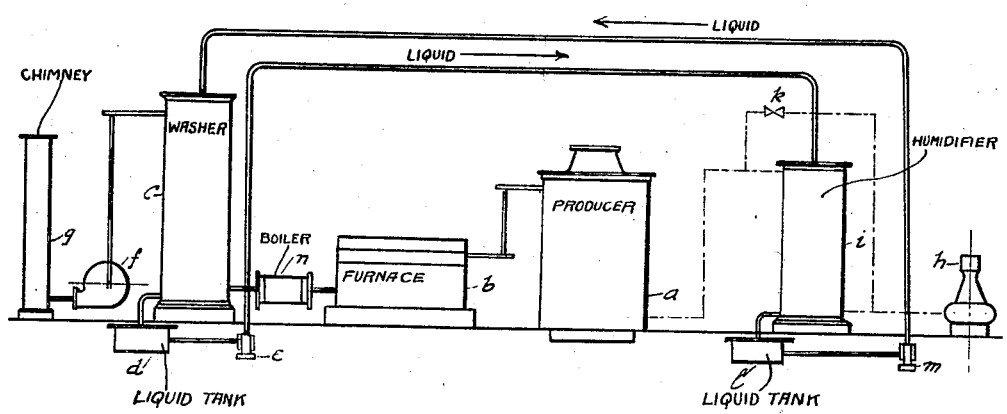

Referring to Fig. 1:

In the producer $a$, gas is produced by means of air and steam as will be hereinafter explained. The gas thus produced is used for firing the furnace plant $b$, which may be a fuel carbonization plant (coke oven, gas retort and the like plant) boiler installation, metallurgical furnace and the like.

The hot products of combustion leaving said furnace plant $b$ pass into the vessel $c$, and issue through the chimney $g$. A fan $f$ may be provided to cause sufficient suction for drawing the products of combustion through said vessel $c$ and discharging them into the chimney $g$.

In the vessel $c$ the ascending hot products of combustion meet a descending current of liquid in such way that they come into intimate contact therewith, so that a large amount of the sensible heat of the products of combustion is transferred to said liquid. The liquid flows into the tank $d$ and is pumped by means of the pump $e$ into the top of a vessel $i$. Here it descends and comes into intimate contact with an ascending current of air which is supplied by the blower $h$, and saturates said air with steam or vapor.

The saturated air then enters the producer $a$. Preferably, a by-pass arrangement may be provided, having a valve or the like, $k$, so that the quantity of air passed through the air saturator $i$ can be regulated, as desired.

The liquid after having saturated the air in the vessel $i$ is run into the tank $l$ and is returned by means of the pump $m$ into the top of the vessel $c$.

Instead of the vessel $c$ or in addition thereto, an additional vessel such as a boiler or heat interchanger may be employed through which the hot products of combustion from the furnace plant are passed for the purpose of raising steam or vapor or heating liquid. In Fig. 1 a boiler $n$ is interposed between the furnace plant $b$ and the vessel $c$. The air saturator $i$ may be constructed in any suitable way, so as to insure a thorough saturation of the air with steam or vapor. The acidity of the circulating liquid may be neutralized by any known means.

Figures 2, 3:
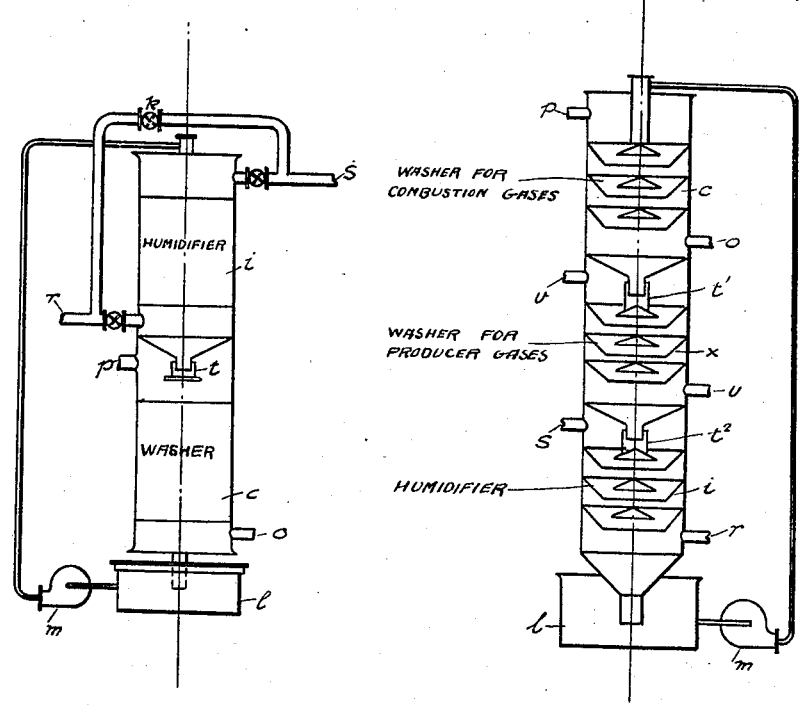
Fig. 2 shows details of the heat interchanger and steam raiser used.
Fig. 3 shows a modification of said construction.

In Fig. 2 the air saturator $i$ is superimposed upon the vessel $c$, thus enabling one tank and one pump to be used, and providing a more compact apparatus.

In this arrangement the products of combustion of the furnace plant enter the bottom of the vessel $c$ at $o$ and leave it at $p$. Air enters the bottom of the upper vessel at $r$ and leaves at $s$. Liquid is circulated through both vessels by the pump $m$. This liquid is heated in the lower vessel $c$ by the products of combustion of the furnace plant $b$ and runs into the tank $l$ whence it is raised by the pump $m$ into the upper part of the upper vessel $i$, and in descending meets an ascending current of air. A water seal $t$ is arranged between the two vessels $c$ and $i$ to prevent the gaseous media from intermixing.

Fig. 3 shows another construction which may be used in connection with the plant shown in Fig. 1. This arrangement is specially suitable in case it is desired to make use of the alkaline products contained in the producer gas for neutralizing any acid matter from the products of combustion of the producer gas fired furnace plant with the object of preventing corrosion.

To this end three vessels $i$, $x$ and $c$ are superimposed. The hot products of combustion coming from the producer gas fired furnace plant are passed through the inlet $o$ into the bottom of the top vessel $c$ where they meet a descending current of liquid. The products of combustion issue through the outlet $p$. The sulfur compounds contained in said products of combustion are to some extent absorbed by said liquid, which is discharged through the seal $t'$ and enters the top of the second vessel $x$. Producer gas from the producer before entering the furnace plant is passed through the bottom inlet $u$ of the second vessel $x$ and issues through $v$ on its way to the furnace plant. The ascending producer gas meets the descending liquor coming from the vessel $c$, and the ammonia contained in the producer gas will tend to neutralize the sulfur or other acid compounds contained in the liquid, issuing from the seal $t'$, thus reducing the tendency to corrosive action. This liquor having been further heated by the hot producer gas passes through the seal $t^2$ into the top of the bottom vessel $i$ and in descending meets an ascending current of air introduced into the bottom of said vessel $i$ at $r$. The air on its way to the producer leaves said vessel $i$ at $s$. The heat of the liquor passing through the seal $t^2$ is given up and communicated to the air in the vessel $i$ which is thus both heated and saturated with vapor. The liquor which now contains some ammonia or ammonium salt in solution runs from the bottom vessel $i$ into the tank $l$ and is pumped back by the pump $m$ to the top of the first vessel $c$.

In the top vessel $c$ the sulfurous acid contained in the products of combustion, is more or less absorbed by the liquor entering said vessel. The liquor leaving the vessel $c$ through the sail $t'$ now contains sulfurous acid in solution, which is converted by the ammonia in the hot producer gas in the second vessel $x$ into ammonium sulfite, which is partly oxidized into ammonium sulfate by the air in the third vessel $i$.

Any resulting ammonium salt may be recovered by any of the well-known methods.

The interior construction of the vessels $c$ and $i$ of Figs. 1, 2 and 3, and of the vessel $x$ of Fig. 3, may be constructed in any suitable way, for example, in the way described in U. S. A. Patent No. 1,081,241 and they may be filled with coke or any other suitable filling material or checker work to insure intimate contact of the gaseous and liquid media.

What I claim and desire to secure by Letters Patent of the United States is:

1. The method of generating and utilizing producer gas which consists in passing the hot products of combustion obtained from furnace plants fired with producer gas into direct intimate contact with a liquid so as to heat said liquid at substantially atmospheric pressure, circulating said heated liquid in contact with a quantity of air so as to heat said air and saturate it with vapor, passing said heated and saturated air into the producer, utilizing the gases generated in said producer for heating said furnace plant, and again passing the liquid used for preheating and saturating the air into contact with the said hot products of combustion of said furnace fired with producer gas in a continuous cycle.

2. The method of generating and utilizing producer gas which consists in passing the hot products of combustion obtained from furnace plants fired with producer gas through a liquid heater so as to indirectly heat liquid contained therein, circulating said heated liquid in contact with a quantity of air, so as to saturate and preheat said air, passing said heated and saturated air into the producer, utilizing the gases generated in said producer for heating said furnace plant, and again passing the liquid used for preheating and saturating the air through said liquid heater in a continuous cycle.

3. The method of generating and utilizing producer gas which consists in passing the hot products of combustion obtained from furnace plants fired with producer gas through a liquid heater so as to indirectly heat liquid contained therein, circulating said heated liquid in contact with a quantity of air to saturate and preheat said air, passing said heated and saturated air into the producer, utilizing the gases generated in said producer for heating said furnace plant, passing the products of combustion leaving said liquid heater in contact with liquid, circulating said heated liquid in contact with air, and again passing the liquid used for preheating and saturating the air through said liquid heater in a continuous cycle.

4. The method of generating and utilizing producer gas which consists in passing the hot products of combustion obtained from furnace plants fired with producer gas into direct intimate contact with a liquid so as to heat said liquid at substantially atmospheric pressure, neutralizing the acidity of said liquid to prevent corrosion of the metal coming into contact therewith, circulating said heated and neutralized liquid in contact with a quantity of air so as to heat said air and saturate it with steam or vapor, passing said heated and saturated air into the producer, utilizing the gases generated in said producer for heating said furnace plant, and again passing the liquid used for preheating and saturating the air into contact with the said hot products of combustion of said furnace fired with producer gas in a continuous cycle.

5. The method of generating and utilizing producer gas which consists in passing the hot products of combustion obtained from furnace plants fired with producer gas into direct intimate contact with a liquid so as to heat said liquid at substantially atmospheric pressure, utilizing the ammonia contained in said producer gas for neutralizing the acidity of said liquid so as to prevent corrosion of the metal coming into contact therewith by passing said producer gas into intimate contact with said heated liquid, circulating said heated and neutralized liquid in contact with a quantity of air so as to heat said air and saturate it with vapor, passing said heated and saturated air into the producer, utilizing the gases generated in said producer for heating said furnace plant and again passing the liquid used for preheating and saturating the air into contact with the said hot products of combustion of said furnace fired with producer gas in a continuous cycle.

6. The method of generating and utilizing producer gas which consists in passing the hot products of combustion obtained from furnace plants fired with producer gas into direct intimate contact with a liquid so as to heat said liquid at substantially atmospheric pressure, and to absorb the acid compounds contained in said gas, utilizing the ammonia contained in said producer gas for neutralizing said acid compounds of said liquid and to prevent corrosion of the metal coming into contact with said liquid by passing said producer gas into intimate contact with said heated liquid, circulating said heated liquid in contact with a quantity of air so as to heat said air and saturate it with vapor, passing said heated and saturated air into the producer, utilizing the gases generated in said producer for heating said furnace plant and again passing the liquid used for preheating and saturating the air into contact with the said hot products of combustion of said furnace fired with producer gas in a continuous cycle.

7. The method of generating and utilizing producer gas which consists in passing the hot products of combustion obtained from furnace plants fired with producer gas into direct intimate contact with a liquid so as to heat said liquid at substantially atmospheric pressure, and to absorb the acid compounds contained in said gases, utilizing the ammonia contained in said producer gas for neutralizing said acid compounds of said liquid by forming an ammonium salt and to prevent corrosion of the metal coming into contact with said liquid by passing said producer gas into intimate contact with said heated liquid, circulating said heated liquid in contact with a preferably regulated quantity of air so as to heat said air and saturate it with vapor, passing said heated and saturated air into the producer, utilizing the gases generated in said producer for heating said furnace plant and again passing the liquid used for preheating and saturating the air into contact with the said hot products of combustion of said furnace fired with producer gas in a continuous cycle.

8. A plant for carrying out the method of generating and utilizing producer gas, consisting of the combination of a furnace plant fired with producer gas with means for causing the hot products of combustion of the producer gas as they issue from said furnace plant to intimately mix with liquid at substantially atmospheric pressure so as to absorb part of the sensible heat of said products of combustion, means for causing the heated liquid to intimately mix with air and saturate same with steam, and means for passing said heated air to the producer.

9. A plant for carrying out the method of generating and utilizing producer gas, consisting of the combination of a furnace plant fired with producer gas with means for causing the hot products of combustion of the producer gas as they issue from said furnace plant to intimately mix with liquid at substantially atmospheric pressure, so as to absorb part of the sensible heat of said products of combustion, and to absorb the acid constituents contained in said products of combustion, means for passing producer gas in contact with said heated acid containing liquid to neutralize said liquid with the ammonia contained in said producer gas, means for causing the heated and neutralized liquid to intimately mix with air to saturate same with steam, and to oxidize the ammonium salt, and means for passing said heated and saturated air to the producer.

In testimony whereof, I affix my signature.

ARTHUR HENRY LYMN.